United States Patent
Mihara et al.

(10) Patent No.: US 11,258,225 B2
(45) Date of Patent: Feb. 22, 2022

(54) LASER OSCILLATOR WITH ENHANCED DEHUMIDIFICATION FUNCTION

(71) Applicant: Fanuc Corporation, Yamanashi (JP)

(72) Inventors: Yoshiki Mihara, Yamanashi (JP);
Akihiko Nishio, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/781,180

(22) Filed: Feb. 4, 2020

(65) Prior Publication Data
US 2020/0259306 A1 Aug. 13, 2020

(30) Foreign Application Priority Data
Feb. 12, 2019 (JP) .............................. JP2019-022954

(51) Int. Cl.
*H01S 3/04* (2006.01)
(52) U.S. Cl.
CPC .......... *H01S 3/0407* (2013.01); *H01S 3/0404* (2013.01); *H01S 3/0405* (2013.01)
(58) Field of Classification Search
CPC .... H01S 3/0404; H01S 3/0405; H01S 3/0407; H01S 3/04; H01S 5/02423; H01S 5/02407; H01S 5/024
See application file for complete search history.

(56) References Cited

U.S. PATENT DOCUMENTS

| | | | | |
|---|---|---|---|---|
| 5,724,818 A | * | 3/1998 | Iwata | H01L 23/38 257/E23.082 |
| 5,992,511 A | * | 11/1999 | Kodaira | H01L 23/467 165/185 |
| 6,298,669 B1 | * | 10/2001 | Maruyama | F25B 21/02 257/E23.082 |
| 9,759,458 B2 | | 9/2017 | Nakajima | |
| 2003/0198264 A1 | * | 10/2003 | Vetrovec | H01S 3/131 372/35 |
| 2003/0231668 A1 | * | 12/2003 | Hoar | H01S 3/042 372/35 |
| 2004/0141164 A1 | * | 7/2004 | Tsuji | G03F 7/70933 355/30 |

(Continued)

FOREIGN PATENT DOCUMENTS

| | | | | | |
|---|---|---|---|---|---|
| CN | 103493613 A | * | 1/2014 | | F25B 21/02 |
| CN | 111226139 A | * | 6/2020 | | G01T 1/244 |

(Continued)

*Primary Examiner* — Joshua King
(74) *Attorney, Agent, or Firm* — RatnerPrestia

(57) ABSTRACT

Provided is a laser oscillator including: one or more heat generating parts disposed in a housing; a piping system through which cooling water flows to the one or more heat generating parts; a water cooling type dehumidifier that dehumidifies air inside the housing using the cooling water; and an air cooling type dehumidifier that includes a Peltier element attached with a cooling fin and a radiating fin and includes a cooling water plate configured to cool the radiating fin with the cooling water, wherein the air cooling type dehumidifier starts to dehumidify the air inside the housing using the cooling fin while the cooling water is not flowing and dehumidifies the air inside the housing by cooling the radiating fin using the cooling water plate when the cooling water is flowing.

11 Claims, 6 Drawing Sheets

(56) References Cited

U.S. PATENT DOCUMENTS

| | | | | |
|---|---|---|---|---|
| 2010/0217444 A1* | 8/2010 | Watanabe | ............. | H01S 3/0407 700/282 |
| 2015/0333467 A1* | 11/2015 | Tanaka | ................. | H01S 3/0407 372/6 |
| 2016/0254635 A1* | 9/2016 | Takazane | ............. | H01S 3/0407 372/35 |
| 2016/0254642 A1* | 9/2016 | Takigawa | ............ | H01S 5/02469 372/34 |
| 2016/0336707 A1* | 11/2016 | Nishio | ................... | G01K 13/00 |
| 2016/0365701 A1* | 12/2016 | Takigawa | ............ | H01S 5/02423 |
| 2017/0063017 A1* | 3/2017 | Mori | ..................... | H01S 3/0407 |
| 2017/0163005 A1* | 6/2017 | Takigawa | ................ | H01S 3/042 |
| 2018/0166852 A1* | 6/2018 | Nukui | ................. | H01S 5/02438 |
| 2019/0109433 A1* | 4/2019 | Takigawa | ............ | H01S 5/022 |
| 2019/0200478 A1* | 6/2019 | Fujimoto | ............... | G05D 22/02 |
| 2019/0319421 A1* | 10/2019 | Nishio | ................ | H01S 3/06704 |

FOREIGN PATENT DOCUMENTS

| | | | | | |
|---|---|---|---|---|---|
| CN | 111697417 A | * | 9/2020 | | |
| DE | 10344085 B3 | * | 6/2005 | ........ | H01S 5/02415 |
| DE | 102016001981 A1 | * | 9/2016 | ............. | H01S 3/041 |
| EP | 2781381 B1 | * | 6/2017 | ......... | H05K 7/20927 |
| JP | 60063963 U | | 5/1985 | | |
| JP | 62008581 A | * | 1/1987 | ............... | H01S 3/04 |
| JP | 02281672 A | * | 11/1990 | ............. | H01S 3/036 |
| JP | 07036464 U | | 7/1995 | | |
| JP | 08057194 A | | 3/1996 | | |
| JP | 11325500 A | | 11/1999 | | |
| JP | 2006075697 A | | 3/2006 | | |
| JP | 2006196644 A | | 7/2006 | | |
| JP | 2011106723 A | | 6/2011 | | |
| JP | 2012156169 A | * | 8/2012 | ............. | F25B 21/02 |
| JP | 2015091214 A | | 5/2015 | | |
| JP | 2017005141 A | | 1/2017 | | |
| JP | 6259419 B2 | * | 1/2018 | ............. | B23K 26/21 |
| KR | 940007600 B1 | * | 8/1994 | | |
| KR | 100272316 B1 | * | 11/2000 | | |
| RU | 177549 U1 | * | 2/2018 | | |
| WO | WO-9308600 A1 | * | 4/1993 | ........... | H01L 23/345 |
| WO | WO-9415388 A1 | * | 7/1994 | ........... | H01S 5/0687 |
| WO | WO-0245218 A1 | * | 6/2002 | ........... | H01S 3/0941 |
| WO | WO-2018096695 A1 | * | 5/2018 | ............... | H05K 7/20 |

* cited by examiner

LASER OSCILLATOR WITH ENHANCED DEHUMIDIFICATION FUNCTION

CROSS-REFERENCE TO RELATED APPLICATIONS

This application is a new U.S. Patent Application that claims benefit of Japanese Patent Application No. 2019-022954 dated Feb. 12, 2019, the disclosure of this application is being incorporated herein by reference in its entirety for all purposes.

BACKGROUND OF THE INVENTION

1. Field of the Invention

The present invention relates to a laser oscillator, and more particularly relates to a laser oscillator with an enhanced dehumidification function.

2. Description of the Related Art

In the related art, in a laser oscillator, heat generating parts are often water cooled to suppress an increase in temperature caused by the heat generating parts such as a power source, an optical component, a resonator, an excitation light source, a control board, and the like. However, when a dew point in a housing of the laser oscillator is higher than the temperature of cooling water, condensation may occur in the housing, causing damage to the laser oscillator due to short circuiting or corrosion of the heat generating parts. Thus, the inside of the housing is dehumidified using a dehumidifier. The documents listed below are each known as related art of dehumidification as described above.

JP 2017-5141 A discloses a laser apparatus including an air cooler that cools air inside of a housing, and a dehumidifier that dehumidifies the air inside the housing.

JP H7-36464 UM-A describes a technique in which a condensation sensor is attached near an output mirror and in which a microcomputer causes an electromagnetic valve attached to a cooling water pipe to be closed when the condensation sensor senses humidity equal to or more than a reference humidity.

JP H8-57194 A discloses a dehumidifying electric clothes dryer in which circulating air from a drying cabinet is subjected to heat exchange with indoor air using a heat exchanger and is further cooled by a cooling fin of a Peltier unit and heated by a radiating fin of the Peltier unit.

JP 2006-75697 A discloses a dehumidifier including a Peltier element interposed between a radiating fin and a cooling fin to guide condensation water produced in the cooling fin toward the radiating fin via a conduit, thereby vaporizing the condensation water.

JP H11-325500 A discloses a small air conditioner that quickly switches between air cooling and heating by causing an electric current flowing in the Peltier element to flow forward or backward.

JP 2011-106723 A discloses a drying apparatus in which an upstream heat exchanger and a downstream heat exchanger are provided in front of and behind a cooling fin, respectively, and a heating medium circulates naturally through a heat exchange pipe due to a difference in temperature and a difference in height between the upstream heat exchanger and the downstream heat exchanger.

SUMMARY OF THE INVENTION

Examples of a dehumidifier include an air cooling type dehumidifier and a water cooling type dehumidifier. The air cooling type dehumidifier does not require cooling water but has a low dehumidification capacity. The water cooling type dehumidifier has a high dehumidification capacity but requires cooling water. Thus, an air cooling type dehumidifier not requiring cooling water is often employed. Unfortunately, the air cooling type dehumidifier has a disadvantage in that dehumidification capacity is insufficient in environments where temperature and humidity are high, and the water cooling type dehumidifier has a disadvantage in that dehumidification cannot be performed until cooling water flows and in that condensation occurs prior to dehumidification when cooling water flows.

Thus, there is a demand for a technique for overcoming both the disadvantages of the air cooling type dehumidifier and the water cooling type dehumidifier so as to enhance the dehumidification functions of a laser oscillator.

An aspect of the present disclosure provides a laser oscillator including: one or more heat generating parts disposed in a housing; a piping system through which cooling water flows to the one or more heat generating parts; a water cooling type dehumidifier that dehumidifies air inside the housing using the cooling water; and an air cooling type dehumidifier that has a Peltier element attached with a cooling fin and a radiating fin and has a cooling water plate configured to cool the radiating fin with the cooling water, wherein the air cooling type dehumidifier starts to dehumidify the air inside the housing using the cooling fin when the cooling water is not flowing, and dehumidifies the air inside the housing while cooling the radiating fin using the cooling water plate when the cooling water is flowing.

DETAILED DESCRIPTION

Figure 1:
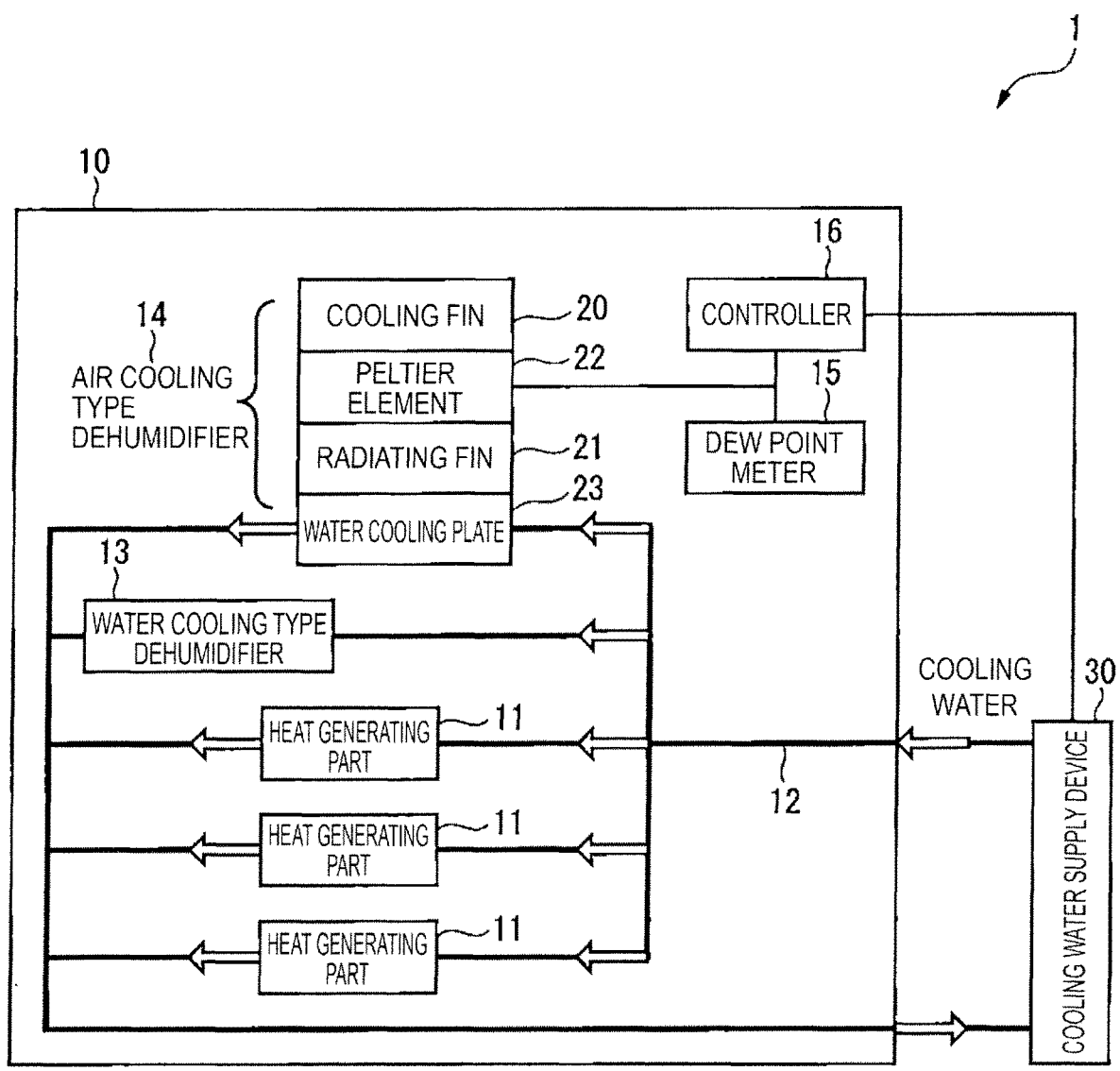
FIG. 1 is a schematic block diagram of a laser oscillator according to an embodiment.

Embodiments of the present disclosure will be described in detail below with reference to the accompanying drawings. In the drawings, identical or similar constituent elements are given identical or similar reference signs. It should be noted that the embodiments described below are not intended to limit the technical scope of the invention or the meaning of terms set forth in the claims.

FIG. 1 is a schematic block diagram of a laser oscillator 1 according to the present embodiment. The laser oscillator 1 includes a sealed housing 10, and the housing 10 is provided inside with a heat generating part 11, a piping system 12, a water cooling type dehumidifier 13, and an air cooling type dehumidifier 14. The heat generating part 11 is a heat generating component such as a power source, an excitation light source, a resonator, an optical component, or the like and is cooled by cooling water having flowed to the piping system 12 from a cooling water supply device 30. When a dew point in the housing is higher than the temperature of the cooling water, condensation occurs in the heat generating part 11, and the heat generating part 11 is damaged by corrosion, short circuiting, or the like. Thus, the water cooling type dehumidifier 13 and the air cooling type dehumidifier 14 dehumidify air inside the housing and decrease the dew point in the housing to reduce condensation.

The water cooling type dehumidifier 13 includes a fin, a radiator, and the like (not illustrated) attached to the piping system 12, and dehumidifies air inside the housing using cooling water flowing into the piping system 12. Although not indispensable, the water cooling type dehumidifier 13 may further include a fan (not illustrated) that blows air inside the housing to the fin. The water cooling type dehumidifier 13 cools air inside the housing with the fin, causing condensation to occur when cooling water is flowing.

The air cooling type dehumidifier 14 includes a Peltier element 22 attached with a cooling fin 20 and a radiating fin 21, and suppresses condensation due to cooling water flowing, by dehumidifying air inside the housing with the cooling fin 20 when the cooling water is not flowing. The air cooling type dehumidifier 14 further includes a water cooling plate 23 that cools the radiating fin 21 with cooling water and improves the dehumidification capacity by cooling the radiating fin 21 using the water cooling plate 23 when cooling water is flowing. The water cooling plate 23 is formed of a material having high thermal conductivity such as copper, aluminum, iron, or the like.

Figure 2A:
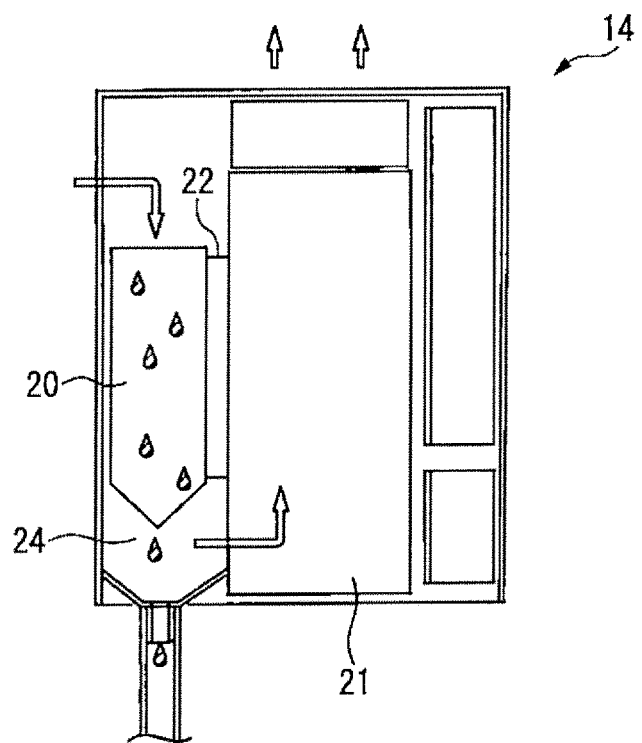
FIG. 2A is a diagram illustrating operation of an air cooling type dehumidifier when cooling water is not flowing.
Figure 2B:
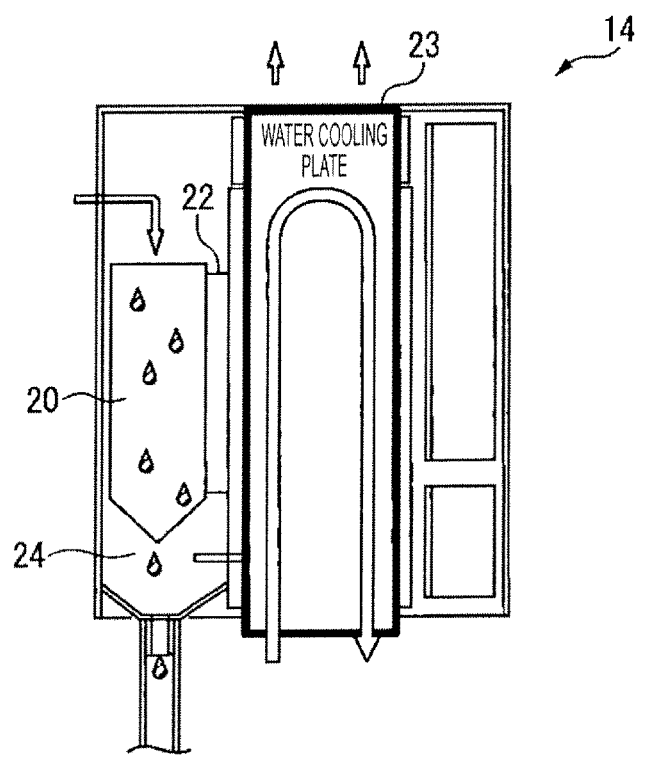
FIG. 2B is a diagram illustrating operation of the air cooling type dehumidifier when cooling water is flowing.

FIG. 2A is a diagram illustrating operation of the air cooling type dehumidifier 14 when cooling water is not flowing, and FIG. 2B is a diagram illustrating the operation of the air cooling type dehumidifier 14 when cooling water is flowing. As illustrated in FIG. 2A, when cooling water is not flowing, the air cooling type dehumidifier 14 cools air inside the housing with the cooling fin 20, and condensation water generated due to the condensation is collected by a funnel 24. Dry air cooled by the cooling fin 20 is heated by the radiating fin 21 and discharged into the housing as warmed dry air. In addition, a difference in temperature between a low temperature side and a high temperature side of the Peltier element 22 is generally constant, and thus, as illustrated in FIG. 2B, the temperature of the cooling fin 20 further decreases due to the radiating fin 21 being cooled by the water cooling plate 23 when cooling water is flowing. Accordingly, the dehumidification capacity of the air cooling type dehumidifier 14 is improved. In addition, by the cooling of radiating fin 21, dry air cooled by the cooling fin 20 is discharged into the housing without a large increase in temperature, and therefore an increase in dew point in the housing can be suppressed.

Referring again to FIG. 1, the laser oscillator 1 may further include a dew point meter 15 and a controller 16 for automatically determining the timing at which to issue a command for cooling water to flow. The controller 16 acquires a dew point in the housing from the dew point meter 15, and after determining that dehumidification has been performed so as to meet a first criterion by the air cooling type dehumidifier 14, the controller 16 instructs the cooling water supply device 30 to cause cooling water to flow. The first criterion is a relatively imprecise criterion, e.g., whether a dew point in the housing is equal to or less than a temperature that is more than a cooling water temperature by 1° C. Accordingly, condensation due to cooling water flowing can be more precisely suppressed. In addition, when cooling water is flowing, the controller 16 determines whether air inside the housing has been dehumidified to a second criterion by both the water cooling type dehumidifier 13 and the air cooling type dehumidifier 14. The second criterion is stricter than the first criterion, e.g., whether a dew point in the housing is equal to or less than a temperature that is less than a cooling water temperature by 2° C. When air inside the housing is not dehumidified to the second criterion even after elapse of a predetermined time, the controller 16 may output a warning signal. The warning signal is used as an emergency stop signal of the laser oscillator 1, for example.

Figure 3:
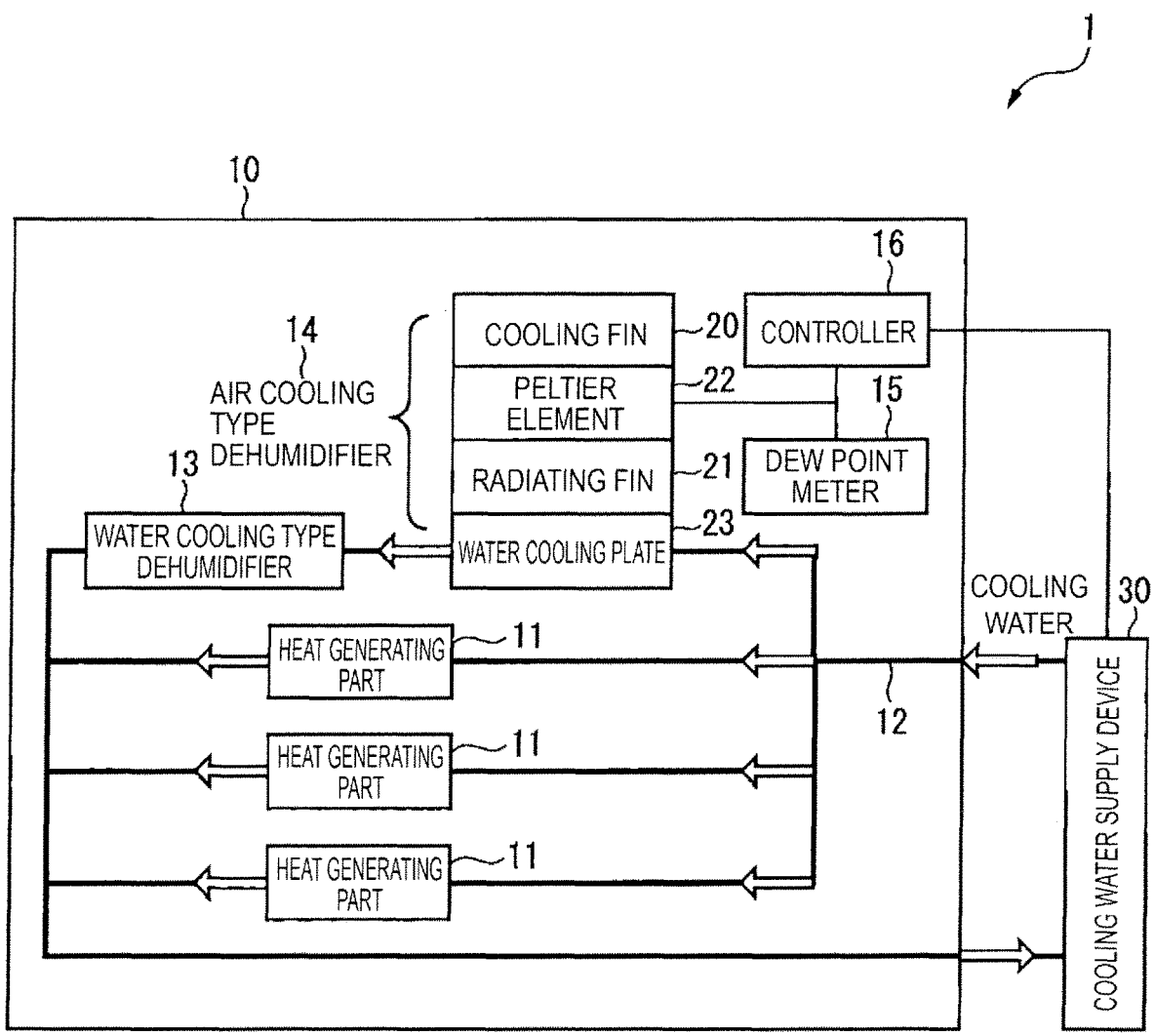
FIG. 3 is a schematic block diagram illustrating a modified example of a laser oscillator.

FIG. 3 is a schematic block diagram illustrating a modified example of the laser oscillator 1. The laser oscillator 1 of the present example differs from the above-described one in that the water cooling type dehumidifier 13 is disposed downstream of the air cooling type dehumidifier 14 in the piping system 12. Exhaust heat of the air cooling type dehumidifier 14 is transferred from the radiating fin 21 to the water cooling plate 23, and cooling water increased in temperature is supplied to the water cooling type dehumidifier 13. The cooling water increased in temperature is cooled by a fin or the like of the water cooling type dehumidifier 13, and thus the water cooling type dehumidifier 13 is slightly deteriorated in terms of dehumidification function. However, an increase in temperature of air inside the housing can be suppressed, so that the dew point in the housing can be maintained in a low state.

Figure 4:
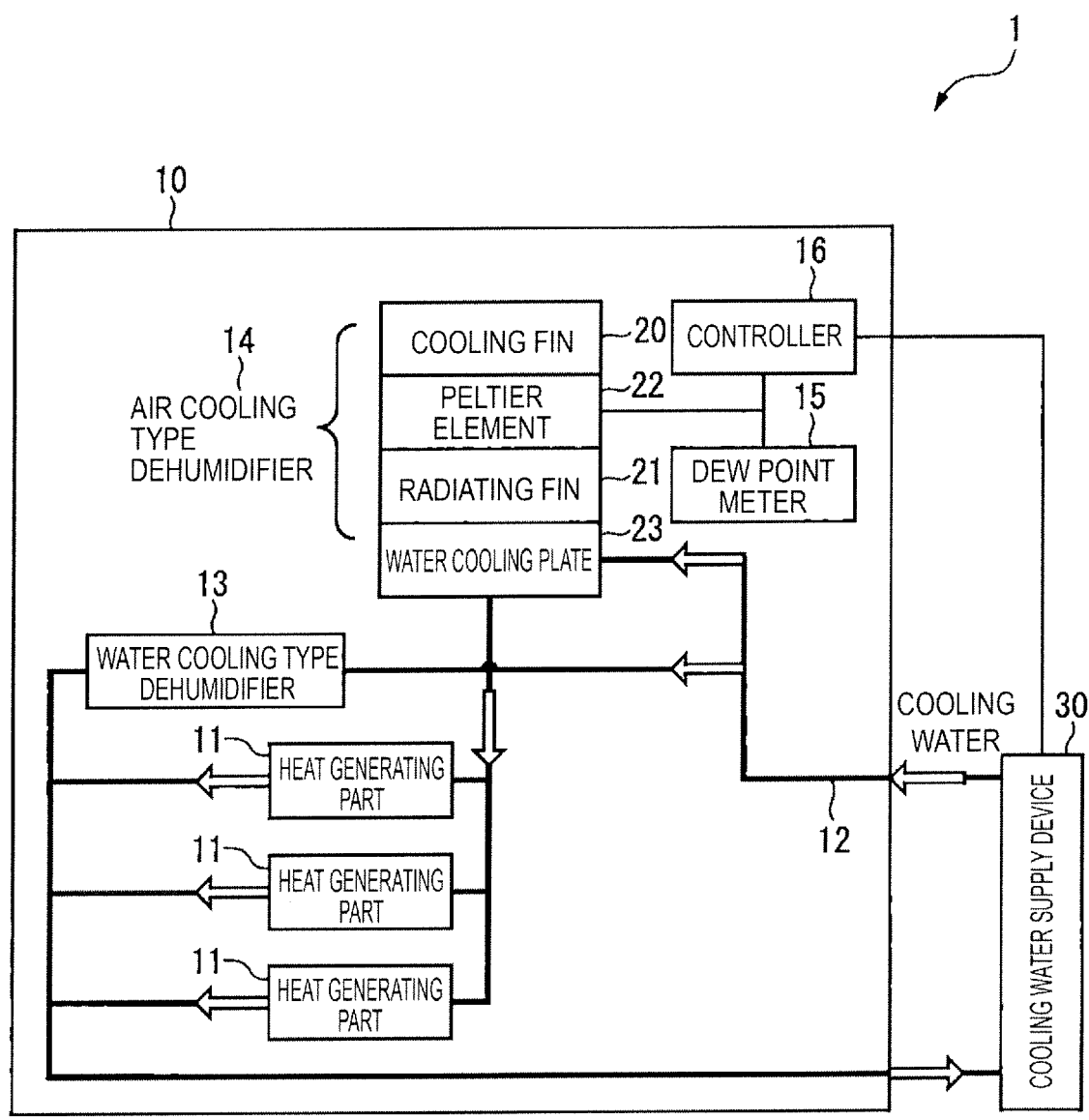
FIG. 4 is a schematic block diagram illustrating another modified example of a laser oscillator.

FIG. 4 is a schematic block diagram illustrating another modified example of the laser oscillator 1. The laser oscillator 1 of the present example differs from the above-described one in that the heat generating part 11 is disposed downstream of the air cooling type dehumidifier 14 in the piping system 12. Exhaust heat of the air cooling type dehumidifier 14 is transferred from the radiating fin 21 to the water cooling plate 23, and cooling water increased in temperature is supplied to the heat generating part 11. Accordingly, although the heat generating part 11 is slightly deteriorated in its cooling function, the heat generating part 11 is less likely to cause condensation.

Figure 5:
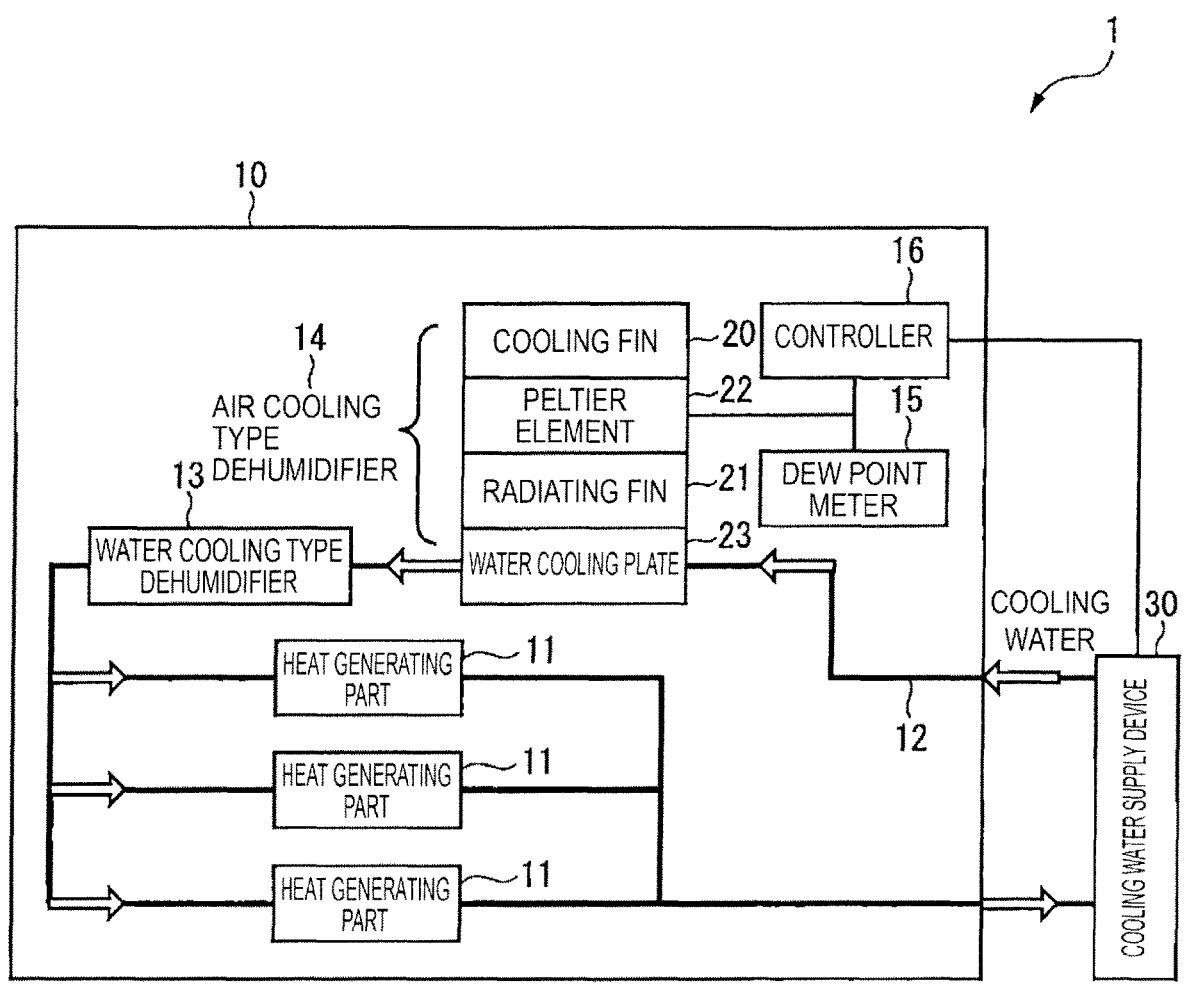
FIG. 5 is a schematic block diagram illustrating yet another modified example of a laser oscillator.

FIG. 5 is a schematic block diagram illustrating yet another modified example of the laser oscillator 1. The laser oscillator 1 of the present example differs from the above-described one in that the heat generating part 11 is disposed downstream of the water cooling type dehumidifier 13 in the piping system 12. Exhaust heat of the water cooling type dehumidifier 13 is transferred to cooling water, and the cooling water increased in temperature is supplied to the heat generating part 11. In addition, the water cooling type dehumidifier 13 is disposed downstream of the air cooling type dehumidifier 14 in the piping system 12, so the cooling water increased in temperature is supplied to the heat generating part 11. Accordingly, condensation of the heat generating part 11 is further suppressed.

Figure 6:
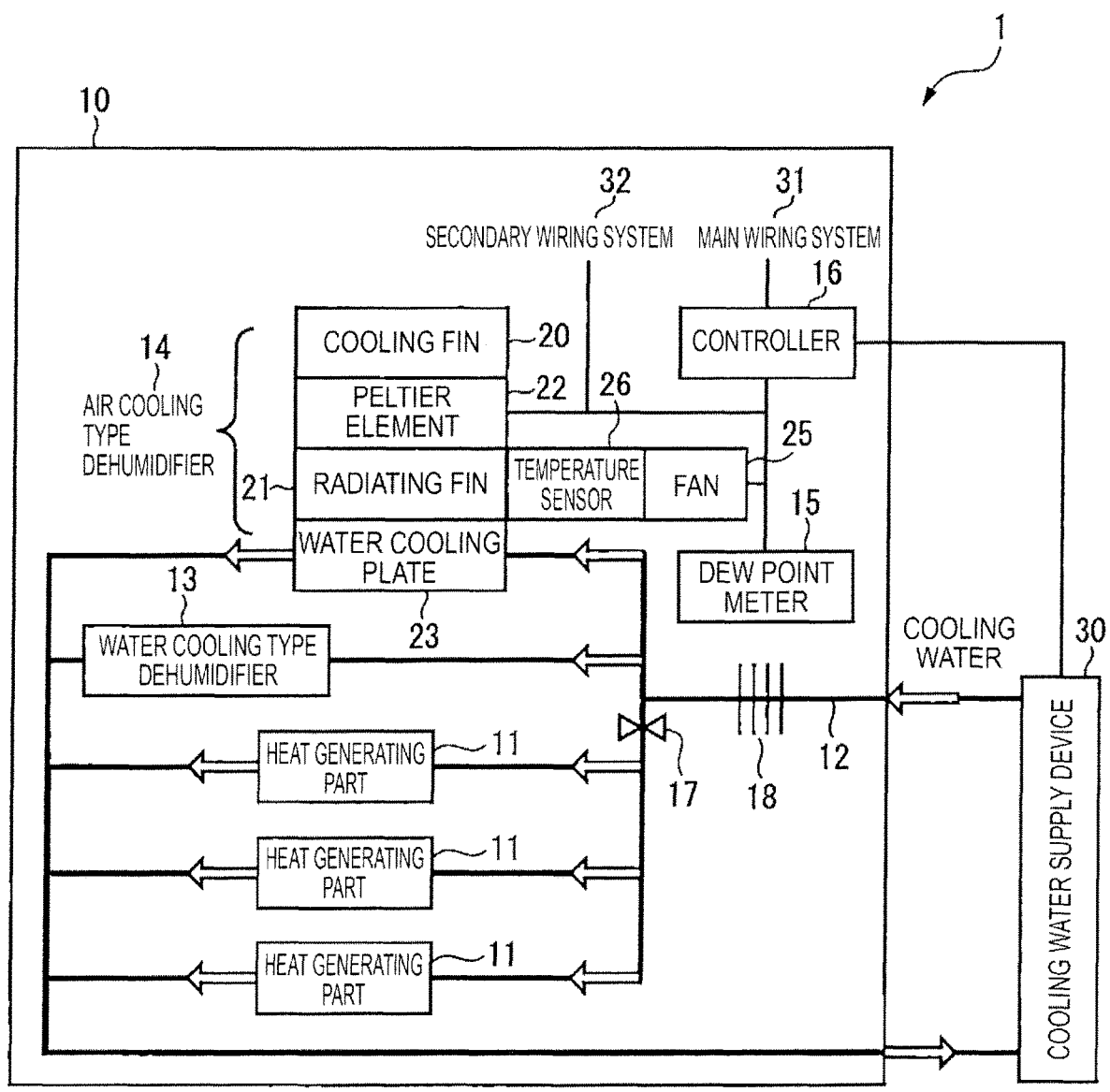
FIG. 6 is a schematic block diagram illustrating still yet another modified example of a laser oscillator.

FIG. 6 is a schematic block diagram illustrating still yet another modified example of the laser oscillator 1. The laser oscillator 1 of the present example further includes a selection part 17 that enables cooling water to flow into both a set of the water cooling type dehumidifier 13 and the air cooling type dehumidifier 14 and the heat generating part 11; or into either the set thereof or the heat generating part 11. The selection part 17 is a control valve that controls causing cooling water to flow into the heat generating part 11, for example, but is not limited thereto and may be an open-close switch that controls opening and closing of a control valve, for example. When the control valve is closed, cooling water does not flow into the heat generating part 11, but flows only into the water cooling type dehumidifier 13 and the air cooling type dehumidifier 14. Accordingly, condensation of the heat generating part 11 due to cooling water flowing can be suppressed. When the control valve is opened, cooling water flows into both the set of the water cooling type dehumidifier 13 and the air cooling type dehumidifier 14 and the heat generating part 11. Thus, preparation for laser oscillation and the like is completed.

The radiating fin 21 is preferably in contact with the housing 10, as well as the water cooling plate 23. This causes exhaust heat of the radiating fin 21 to be dissipated to outdoor air through the housing 10, so temperature of the cooling fin 20 is further reduced to increase the dehumidification capacity of the air cooling type dehumidifier 14.

The laser oscillator 1 may further include a condensation part 18 upstream of the piping system 12. The condensation part 18 may be a fin made of copper, aluminum, iron, or the like having a high thermal conductivity, for example. Cooling water temperature is low upstream of the piping system 12. Thus, when air inside the housing is condensed by the condensation part 18 earlier, condensation on a downstream side, particularly on the heat generating part 11, can be effectively suppressed.

The air cooling type dehumidifier 14 may always be activated in the state where the controller 16 is turned on. Instead, the air cooling type dehumidifier 14 may be powered from a secondary wiring system 32 separate from a main wiring system 31 of the laser oscillator 1 and may always be activated after installation of the laser oscillator 1. When the air cooling type dehumidifier 14 is maintained in a permanently activated state, the dew point in the housing can always be maintained in a low state. In addition, the number of times that the air cooling type dehumidifier 14 is turned on and off is reduced, and thus lifespan deterioration due to a heat cycle is also suppressed.

The air cooling type dehumidifier 14 may further include a fan 25 that cools the radiating fin 21. When the air cooling type dehumidifier 14 is always activated, the radiating fin 21 may overheat to have a temperature exceeding an upper limit temperature of the Peltier element 22. Thus, the Peltier element 22 may be set to a high drive voltage when the fan 25 is in operation, and the Peltier element 22 may be to a low drive voltage when the fan 25 is idle, such that the Peltier element 22 does not have a temperature exceeding the upper limit temperature within a range of an allowable installation environment temperature of the laser oscillator 1.

The air cooling type dehumidifier 14 further may include a temperature sensor 26 that detects the temperature of the radiating fin 21, and when the temperature of the radiating fin 21 exceeds the upper limit temperature, the power source of the Peltier element 22 may be disconnected. Accordingly, on-off control of the air cooling type dehumidifier 14 can be performed on a uniform basis.

According to the embodiment described above, when the cooling water is not flowing, air in the housing is dehumidified only by the air cooling type dehumidifier 14 to suppress condensation due to cooling water flowing, and when the cooling water is flowing, the radiating fin 21 of the air cooling type dehumidifier 14 is cooled by the water cooling plate 23 to improve the dehumidification capacity of the air cooling type dehumidifier 14. The water cooling type dehumidifier 13 also performs dehumidification, thereby enabling the dehumidification capabilities of the laser oscillator 1 to be enhanced.

Although some embodiments have been described in this specification, the present invention is not limited to the above-described embodiments, and it is to be understood that various changes can be made without departing from the scope of the appended claims.

The invention claimed is:

1. A laser oscillator comprising:
   one or more heat generating parts disposed in a housing;
   a piping system through which cooling water flows to the one or more heat generating parts;
   a water cooling type dehumidifier that dehumidifies air inside the housing using the cooling water; and
   an air cooling type dehumidifier that includes a Peltier element attached with a cooling fin and a radiating fin and includes a cooling water plate configured to cool the radiating fin with the cooling water, wherein
   the air cooling type dehumidifier starts to dehumidify the air inside the housing using the cooling fin when the cooling water is not flowing and dehumidifies the air inside the housing while cooling the radiating fin using the cooling water plate when the cooling water is flowing.

2. The laser oscillator of claim 1, further comprising:
   a controller that issues a command for the cooling water to flow after determining that the air cooling type dehumidifier performs dehumidification to a first criterion and that determines that both the water cooling type dehumidifier and the air cooling type dehumidifier perform dehumidification to a second criterion stricter than the first criterion.

3. The laser oscillator of claim 2, wherein
   the controller outputs a warning signal when the air inside the housing is not dehumidified to the second criterion even after a predetermined time has elapsed.

4. The laser oscillator of claim 1, wherein
   the water cooling type dehumidifier is disposed downstream of the air cooling type dehumidifier in the piping system.

5. The laser oscillator of claim 4, wherein
   the heat generating part is disposed downstream of the air cooling type dehumidifier or the water cooling type dehumidifier in the piping system.

6. The laser oscillator of claim 1, further comprising:
   a selection part that enables the cooling water to flow into both a set of the water cooling type dehumidifier and the air cooling type dehumidifier and the heat generating part; or into either the set thereof or the heat generating part.

7. The laser oscillator of claim 1, wherein
   the radiating fin is in contact with the housing.

8. The laser oscillator of claim 1, further comprising:
   a condensation part disposed upstream of the piping system inside the housing.

9. The laser oscillator of claim 1, wherein
   the air cooling type dehumidifier is always activated in a state of being turned on or is always activated by being powered by a secondary wiring system separate from a main wiring system of the laser oscillator after installation of the laser oscillator.

10. The laser oscillator according to claim 9, wherein
    the air cooling type dehumidifier further includes a fan that cools the radiating fin, and
    the Peltier element is set to a high drive voltage when the fan is in operation, and the Peltier element is set to a low drive voltage when the fan is idle, such that the Peltier element does not have a temperature exceeding an upper limit temperature within a range of an allowable installation environment temperature of the laser oscillator when the air cooling type dehumidifier is always activated.

11. The laser oscillator of claim 10, wherein
when the radiating fin has a temperature exceeding the upper limit temperature, a power source of the Peltier element is disconnected.

* * * * *